(12) United States Patent
Paul

(10) Patent No.: US 10,783,061 B2
(45) Date of Patent: Sep. 22, 2020

(54) REDUCING LIKELIHOOD OF CYCLES IN USER INTERFACE TESTING

(71) Applicant: Microsoft Technology Licensing, LLC, Redmond, WA (US)

(72) Inventor: Parag Nandan Paul, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/015,671

(22) Filed: Jun. 22, 2018

(65) Prior Publication Data

US 2019/0391906 A1    Dec. 26, 2019

(51) Int. Cl.
G06F 9/44 (2018.01)
G06F 11/36 (2006.01)
G06F 8/38 (2018.01)

(52) U.S. Cl.
CPC ............ *G06F 11/3664* (2013.01); *G06F 8/38* (2013.01); *G06F 11/3612* (2013.01); *G06F 11/3688* (2013.01)

(58) Field of Classification Search
CPC .... G06F 8/38; G06F 11/3664; G06F 11/3612; G06F 11/3688
USPC ........................................................ 717/125
See application file for complete search history.

(56) References Cited

U.S. PATENT DOCUMENTS

| | | | | |
|---|---|---|---|---|
| 5,555,201 A * | 9/1996 | Dangelo | .......... | G01R 31/31704 703/13 |
| 5,933,633 A * | 8/1999 | Good | .............. | G01R 31/31835 703/17 |
| 7,133,819 B1 * | 11/2006 | Hutton | ................ | G06F 30/3312 703/19 |
| 7,797,083 B1 * | 9/2010 | Brumett, Jr. | .......... | G06F 1/3203 700/292 |
| 8,464,229 B2 * | 6/2013 | Thomson | .................. | G06F 8/38 714/15 |
| 8,589,883 B2 | 11/2013 | Demant et al. | | |
| 9,141,518 B2 | 9/2015 | Bharadwaj et al. | | |
| 9,773,083 B1 * | 9/2017 | Das | ........................ | G06F 30/394 |
| 10,261,760 B1 * | 4/2019 | Gu | .......................... | G06F 17/505 |
| 2003/0225811 A1 * | 12/2003 | Ali | ............................ | G06F 8/10 718/101 |

(Continued)

FOREIGN PATENT DOCUMENTS

CN    105653441 A    6/2016

OTHER PUBLICATIONS

Title: Dynamic Prediction of Critical Path Instructions, author : Eric Tune et al, published on 2001.*

(Continued)

*Primary Examiner* — Chameli Das
(74) *Attorney, Agent, or Firm* — Ray Quinney & Nebeker, P.C.; Thomas M. Hardman; Timothy J. Churna

(57) ABSTRACT

A method for testing a user interface includes determining states and state transitions associated with the user interface. A first plurality of states and a first plurality of state transitions of the user interface may be explored. A subset of a second plurality of states and a second plurality of state transitions of the user interface may also be explored. Paths that lead to cycles within the subset of the second plurality of states and the second plurality of state transitions may be penalized.

17 Claims, 10 Drawing Sheets

(56) References Cited

U.S. PATENT DOCUMENTS

| | | | | |
|---|---|---|---|---|
| 2005/0149868 | A1* | 7/2005 | Katayama | G06F 8/38 715/700 |
| 2005/0193269 | A1* | 9/2005 | Haswell | G06F 11/3684 714/38.13 |
| 2006/0015830 | A1* | 1/2006 | Schwarzmann | G06Q 10/047 703/2 |
| 2008/0222539 | A1* | 9/2008 | Konaka | G06F 8/38 715/762 |
| 2008/0275910 | A1* | 11/2008 | Molina-Moreno | G06F 8/35 |
| 2008/0320486 | A1* | 12/2008 | Bose | G06Q 10/06 718/105 |
| 2010/0180240 | A1* | 7/2010 | Davis | G06F 17/5031 716/113 |
| 2011/0231708 | A1* | 9/2011 | Lawrance | G06F 11/3684 714/38.1 |
| 2012/0149476 | A1* | 6/2012 | Perlman | A63F 13/52 463/42 |
| 2012/0182865 | A1* | 7/2012 | Andersen | H04L 1/22 370/228 |
| 2015/0370541 | A1* | 12/2015 | Prasad | G06F 8/38 717/104 |
| 2016/0328312 | A1* | 11/2016 | Loder | G06F 11/3688 |
| 2017/0277624 | A1 | 9/2017 | Avadhanula et al. | |
| 2018/0052666 | A1 | 2/2018 | Zhang et al. | |
| 2018/0218276 | A1* | 8/2018 | Suman | G06F 11/3452 |
| 2018/0335939 | A1* | 11/2018 | Karunamuni | G06F 3/0481 |

OTHER PUBLICATIONS

Title: Focusing Procesor Policies via Critical Path Prediction, author: Brian Fields et al, published on 2001.*

Belli, Fevzi, "Finite-State Testing of Graphical User Interfaces", In Proceedings of 12th International Symposium on Software Reliability Engineering, Nov. 27, 2001, pp. 1-21.

Cheng, et al., "GUICat: GUI Testing as a Service", In Proceedings of 31st IEEE/ACM International Conference on Automated Software Engineering, Sep. 3, 2016, 6 Pages.

Liu, et al., "DECAF: Detecting and Characterizing Ad Fraud in Mobile Apps", In Proceedings of 11th USENIX Symposium on Networked Systems Design and Implementation, Apr. 2, 2014, pp. 57-70.

Mirzaei, et al., "Reducing Combinatorics in GUI Testing of Android Applications", In Proceedings of IEEE/ACM 38th International Conference on Software Engineering, May 14, 2016, 12 Pages.

* cited by examiner

FIG. 5A

| | Home | Favorites | Page F1 | Page F2 | Page F3 | ... |
|---|---|---|---|---|---|---|
| Home | | +1 | | | | ... |
| Favorites | -1 | | -1 | | | ... |
| Page F1 | | | | +1 | | ... |
| Page F2 | -1 | | | | +1 | ... |
| Page F3 | | | | | | ... |
| ... | ... | ... | ... | ... | ... | ... |

FIG. 5B

| | Home | Favorites | Page F1 | Page F2 | Page F3 | ... |
|---|---|---|---|---|---|---|
| Home | | +1 | | | | ... |
| Favorites | | | | | | ... |
| Page F1 | | | | | | ... |
| Page F2 | | | | | | ... |
| Page F3 | | | | | | ... |
| ... | ... | ... | ... | ... | ... | ... |

SUM: +1

FIG. 5C

|  | Home | Favorites | Page F1 | Page F2 | Page F3 | ... |
|---|---|---|---|---|---|---|
| Home |  |  |  |  |  | ... |
| Favorites (532a) | +1 |  |  |  |  | ... |
| Page F1 (532b) |  | +1 |  |  |  | ... |
| Page F2 |  |  |  |  |  | ... |
| Page F3 |  |  |  |  |  | ... |
| ... | ... | ... | ... | ... | ... | ... |

SUM: +2

|  | Home | Favorites | Page F1 | Page F2 | Page F3 | ... |
|---|---|---|---|---|---|---|
| Home |  |  |  |  |  | ... |
| Favorites (532a) | +1 |  |  |  |  | ... |
| Page F1 (532b) |  | +1 |  |  |  | ... |
| Page F2 (532c) |  |  | +1 |  |  | ... |
| Page F3 |  |  |  |  |  | ... |
| ... | ... | ... | ... | ... | ... | ... |

SUM: +3

(528)

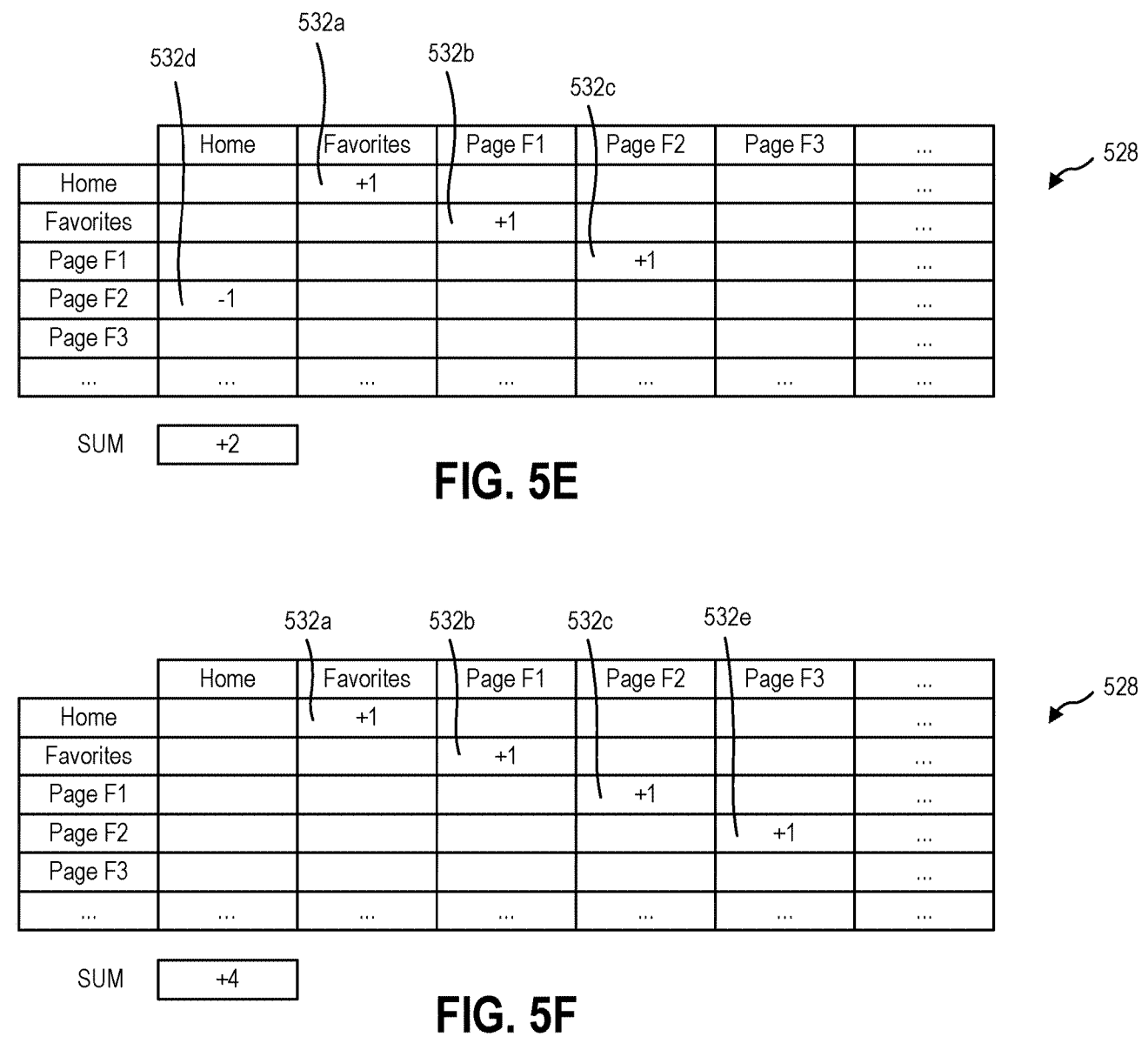

|          | Home | Favorites | Page F1 | Page F2 | Page F3 | ... |
|----------|------|-----------|---------|---------|---------|-----|
| Home     |      | +1        |         | −1      |         | ... |
| Favorites|      |           | +1      |         |         | ... |
| Page F1  |      |           |         | +1      |         | ... |
| Page F2  |      |           |         |         |         | ... |
| Page F3  |      |           |         |         |         | ... |
| ...      | ...  | ...       | ...     | ...     | ...     | ... |

SUM: +2

FIG. 5E

|          | Home | Favorites | Page F1 | Page F2 | Page F3 | ... |
|----------|------|-----------|---------|---------|---------|-----|
| Home     |      | +1        |         |         |         | ... |
| Favorites|      |           | +1      |         |         | ... |
| Page F1  |      |           |         | +1      |         | ... |
| Page F2  |      |           |         |         | +1      | ... |
| Page F3  |      |           |         |         |         | ... |
| ...      | ...  | ...       | ...     | ...     | ...     | ... |

SUM: +4

FIG. 5F

REDUCING LIKELIHOOD OF CYCLES IN USER INTERFACE TESTING

CROSS-REFERENCE TO RELATED APPLICATIONS

N/A

BACKGROUND

An application is a computer program that is designed to perform a group of coordinated functions, tasks, or activities. Applications are sometimes referred to as "apps," especially if they are built for mobile platforms. There are many different types of applications in use today, including word processors, spreadsheets, presentation programs, calendars, web browsers, email clients, messaging apps, media players, video games, photo editors, social media apps, and so forth.

A user interacts with an application via a user interface. Most modern applications have graphical user interfaces (GUI), which include graphical elements such as navigational controls (e.g., navigational panels, context menus, control ribbons), input controls (e.g., checkboxes, radio buttons, dropdown lists), and informational components (e.g., progress bars, message boxes). User actions in a GUI are usually performed through direct manipulation of the graphical elements. The content of a GUI may be organized into multiple pages, and a user may navigate between the various pages through the use of the navigational controls that exist within the GUI.

The user interface of an application may be tested to verify that the various elements of the user interface function as intended. Testing may provide information about errors and other issues that may detrimentally affect a user's experience with the application.

BRIEF DESCRIPTION OF THE DRAWINGS

FIG. 5A illustrates a portion of a data structure that may be used to define costs that are associated with particular state transitions.

FIGS. 5B-5F illustrate portions of a data structure that may be used to maintain tallies indicating the total cost that has been incurred during particular tests.

DETAILED DESCRIPTION

User interface testing is often a bottleneck in the long-term development cycle of an application. One known testing framework involves recording actual user interactions with the user interface of an application and then replaying those interactions during a testing stage. This type of approach, however, is not methodical. It is also not targeted to important aspects of the user interface, and as a result many important aspects of the user interface may remain untested. Also, because the set of tests that are performed on the user interface are manually created, this type of testing is essentially static and cannot be easily adapted to test parts of the user interface that may be subsequently changed or added.

Another known framework for testing user interfaces is sometimes referred to as "monkey testing." This testing framework, which is typically designed to facilitate stress testing (i.e., testing the user interface beyond the limits of normal operation), involves having a testing program randomly generate coordinates and simulate different types of user interactions based on those coordinates. Again, however, this type of testing is not methodical or targeted to important aspects of the user interface, and as a result many important aspects of the user interface may remain untested. Moreover, under some circumstances the testing program may enter into cycles where the same parts of the user interface are repeatedly tested, which wastes testing resources. Another problem is that randomly generated user interactions may activate hyperlinks to external locations, thereby causing the testing program to shift its focus from the application under test to websites or other applications.

The techniques disclosed herein enable more thorough testing of a user interface than is possible with known approaches. In accordance with the present disclosure, a user interface of an application may be represented as a finite state machine having multiple states and various transitions between the states. Some of the states and state transitions may be tested systematically, while other states and state transitions may be selectively tested. Where selective testing is used, paths that lead to cycles or redundant paths may be penalized. This causes more frequent traversal of new paths, thus leading toward more complete testing of the user interface.

Figure 1:
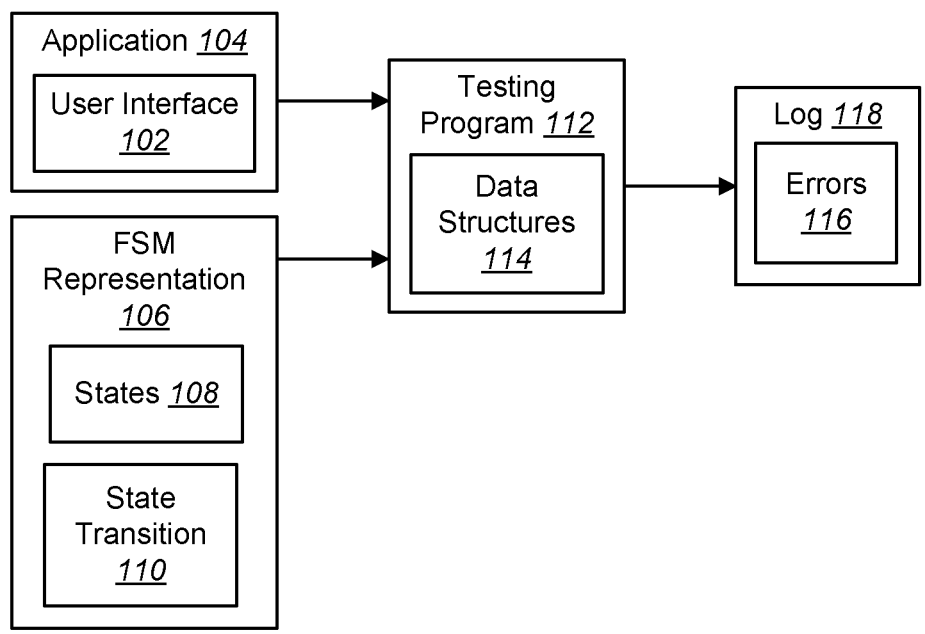
FIG. 1 illustrates a system for testing a user interface of an application in accordance with the present disclosure.

FIG. 1 illustrates a system 100 for testing a user interface 102 of an application 104 in accordance with the present disclosure. A finite state machine (FSM) representation 106 of the user interface 102 may be created. The FSM representation 106 may define possible states 108 and possible state transitions 110 of the user interface 102. In this context, the term "state" may refer to a particular condition of the user interface 102, which may be described in terms of the page(s) and/or other elements of the user interface 102 that are being displayed to the user. The term "state transition" may refer to a change from one state to another.

Broadly speaking, the states 108 and state transitions 110 in the FSM representation 106 may be divided into two categories: (i) states 108 and state transitions 110 that are of highest importance and should be tested systematically, and (ii) states 108 and state transitions 110 that are of lesser importance and can be selectively tested. In accordance with the present disclosure, a testing program 112 may be configured to explore all of the states 108 and state transitions 110 in category (i), but may only explore a subset of the states 108 and state transitions 110 in category (ii).

As part of exploring the subset of the states 108 and state transitions 110 in category (ii), the testing program 112 may be configured to penalize paths that lead to cycles. In this context, the term "path" may refer to a sequence of states 108 and state transitions 110 that the testing program 112 may explore when it performs testing. The term "cycle" may refer to a path that is repeated multiple times. The term "explore" refers to one or more actions that may be taken to investigate aspects of the user interface 102. For example, the testing program 112 explores a particular state 108 when it causes the user interface 102 to navigate to that state 108. The testing program 112 explores a particular state transition 110 when it activates one or more elements of the user interface 102 in order to cause that state transition 110 to occur.

It is generally desirable to prevent the testing program 112 from entering cycles to the extent possible. In a user interface 102 of average complexity, there may be a very large number (e.g., millions) of paths that may be traversed among the various states 108 and state transitions 110. Given the amount of time that is typically available for testing, it is generally not possible to test all of these paths. It is, however, desirable to test as many of these paths as possible. By penalizing paths that lead to cycles, the testing program 112 may be able to maximize the number of unique paths that are tested, thereby increasing the effectiveness of the testing and the usefulness of the testing results.

The testing program 112 may utilize various data structures 114 to keep track of information that makes it possible to penalize paths that are susceptible to cycles. These data structures 114 may operate to bias the testing program 112 away from paths that are susceptible to cycles. In some implementations, the data structures 114 may define costs that are associated with particular state transitions 110. State transitions 110 that are less susceptible to cycles may be associated with more favorable costs than the state transitions 110 that are more susceptible to cycles. The data structures 114 may also maintain tallies indicating the total cost that has been incurred during particular tests. The testing program 112 may be configured to select state transitions 110 in a probabilistic manner based on the associated costs. Some examples of these data structures 114 and how they may be used to penalize certain paths and to favor other paths will be described below.

If errors 116 (e.g., crash events) are detected during testing, the testing program 112 may record the errors 116 in a log 118. The entries in the log 118 may be made available to interested parties, such as developers of the application 104, who may use this information to improve the user interface 102 by correcting the errors 116 that are discovered.

Figure 2:
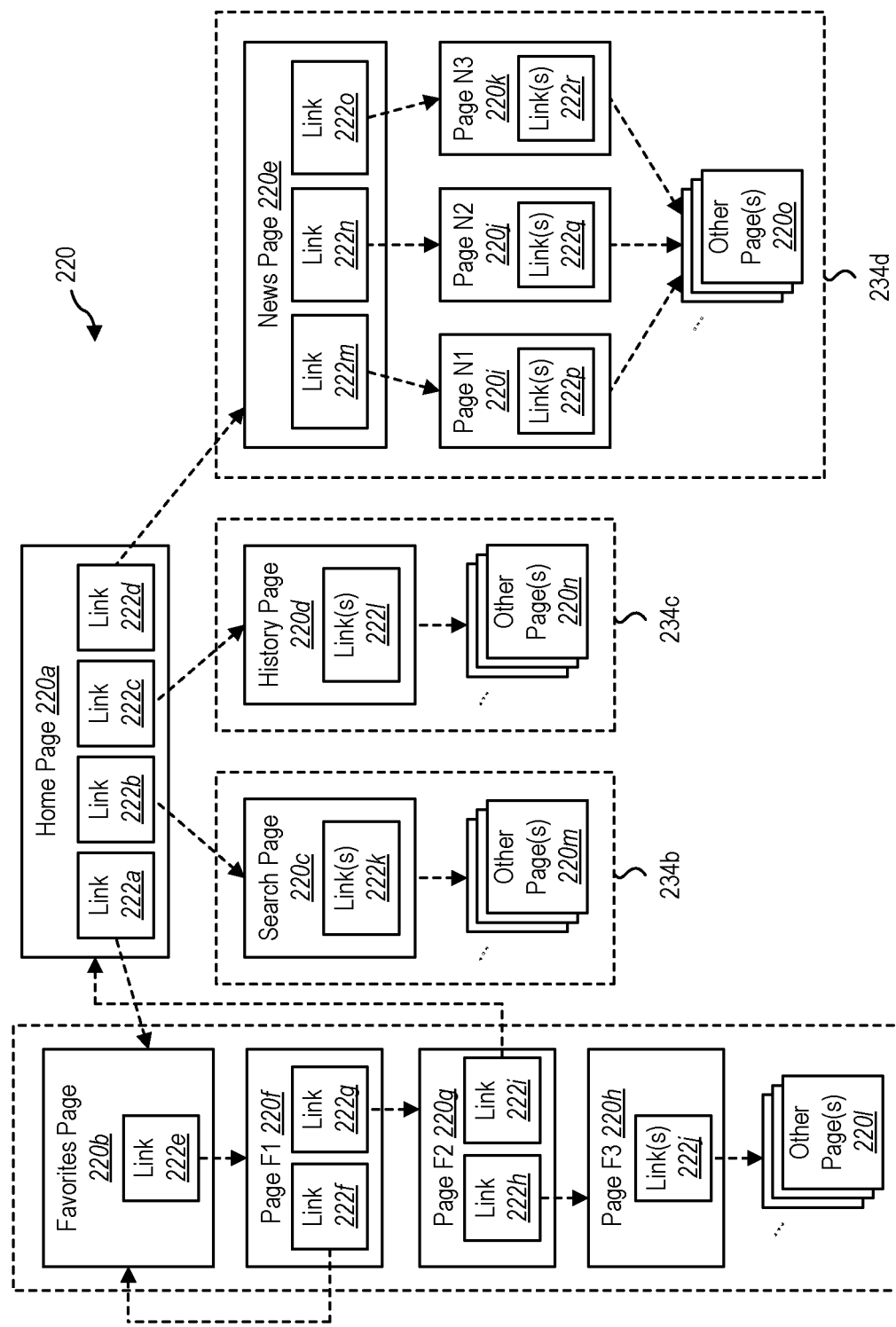
FIG. 2 illustrates an example showing various pages that may be included in a user interface for an application.

FIG. 2 illustrates an example showing various pages 220 that may be included in a user interface 102 for an application 104. The user interface 102 may include a home page 220a, which may be the main page of the user interface 102. The home page 220a may include links 222a-d (e.g., hyperlinks) that facilitate navigation to other pages 220 of the user interface 102. In the depicted example, the home page 220a includes a link 222a to a favorites page 220b, a link 222b to a search page 220c, a link 222c to a history page 220d, and a link 222d to a news page 220e.

In the depicted example, the favorites page 220b includes a link 222e to another page that will be referred to as page F1 220f. Page F1 220f includes a link 222f back to the favorites page 220b and a link 222g to another page that will be referred to as page F2 220g. Page F2 220g includes a link 222h to another page that will be referred to as page F3 220h. Page F2 220g also includes a link 222i back to the home page 220a. Page F3 220h may include one or more links 222j to one or more other pages 220l.

The search page 220c includes one or more links 222k to one or more other pages 220m. Similarly, the history page 220d includes one or more links 222l to one or more other pages 220n.

The news page 220e includes a link 222m to a page that will be referred to as page N1 220i, a link 222n to a page that will be referred to as page N2 220j, and a link 222o to a page that will be referred to as page N3 220k. These pages 220i-k include links 222p-r to other pages 220o.

The pages 220 of the user interface 102 may include other links in addition to those that are specifically shown in FIG. 2. For example, some or all of the pages 220 may include a link back to the home page 220a.

For the sake of clarity, the depicted user interface 102 is relatively simple in that it only includes a few pages 220. This, however, should not be interpreted as limiting the scope of the present disclosure. The inventive principles disclosed herein are applicable to user interfaces of varying degrees of complexity, including user interfaces that are much more complex (or less complex) than those discussed herein.

Figure 3:
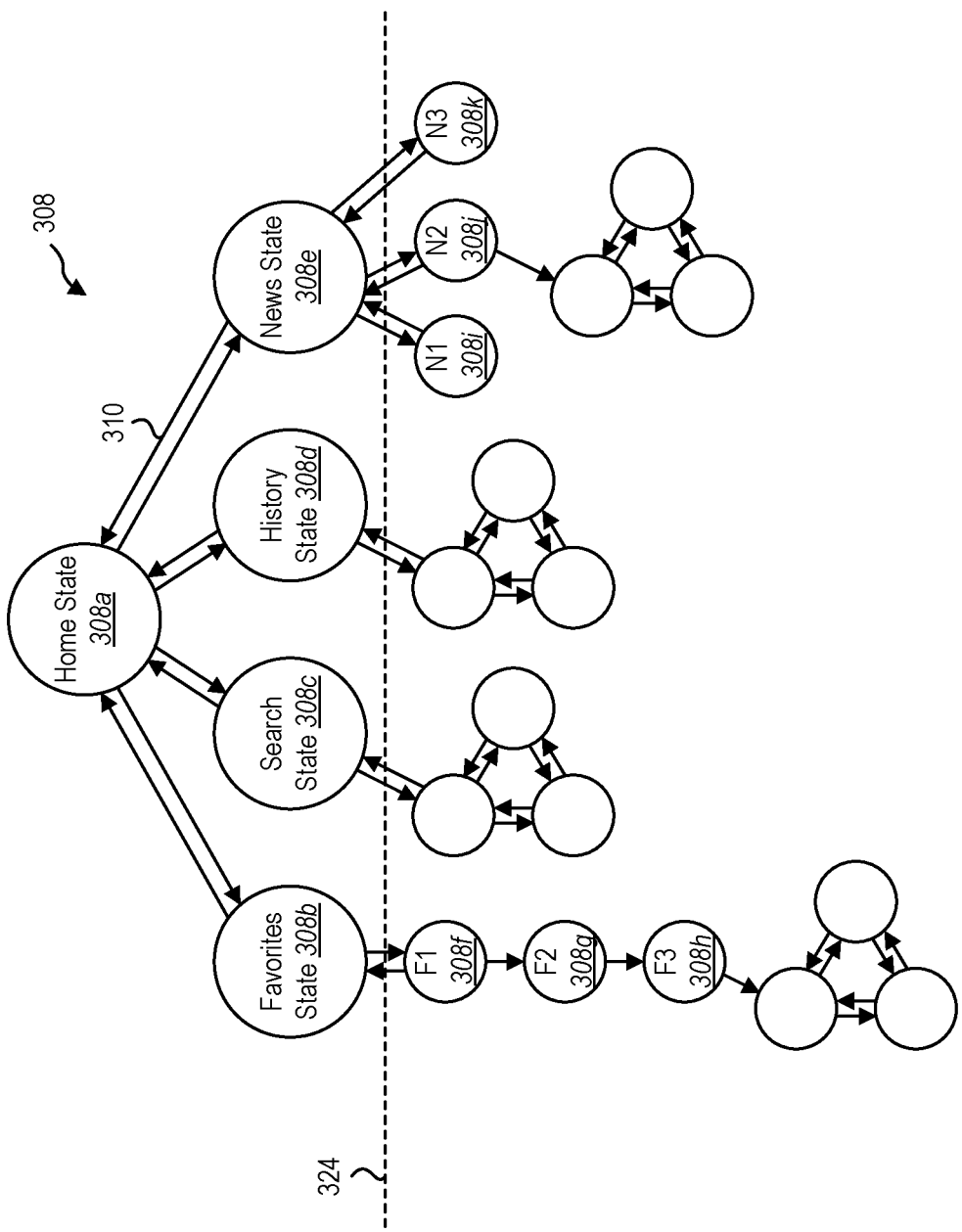
FIG. 3 illustrates an example of a finite state machine representation of the user interface whose pages are shown in FIG. 2.

FIG. 3 illustrates an example of an FSM representation of the user interface 102 whose pages 220 are shown in FIG. 2. The FSM representation is depicted as a graph with nodes corresponding to the states 308 of the user interface 102 and edges corresponding to state transitions 310. The states 308 may correspond to different pages 220 of the user interface 102. For example, a home state 308a may correspond to a condition of the user interface 102 in which the home page 220a is displayed, a favorites state 308b may correspond to a condition of the user interface 102 in which the favorites page 220b is displayed, and so forth. Other states 308 that are shown in FIG. 3 include a search state 308c (corresponding to the search page 220c), a history state 308d (corresponding to the history page 220d), a news state 308e (corresponding to the news page 220e), a page F1 state 308f (corresponding to page F1 220f), a page F2 state 308g (corresponding to page F2 220g), a page F3 state 308h (corresponding to page F3 220h), a page N1 state 308i (corresponding to page N1 220i), a page N2 state 308j (corresponding to page N2 220j), and a page N3 state 308k (corresponding to page N3 220k).

The testing program 112 may initiate a state transition 310 by activating one or more elements of the user interface 102. For example, when the user interface 102 is in the home state 308a, the testing program 112 may activate the link 222a to the favorites page 220b in order to transition from the home state 308a (in which the home page 220a is displayed) to the favorites state 308b (in which the favorites page 220b is displayed).

Each of the states 308 may be associated with a particular depth. In this context, the term "depth" may indicate the position of a particular state 308 relative to the home state 308a. For example, in some implementations, the home state 308a may be associated with a depth of one. The states 308b-e that are only one transition 310 away from the home state 308a (namely, the favorites state 308b, the search state 308c, the history state 308d, and the news state 308e in the depicted example) may be associated with a depth of two. The states 308f-k that are more than one transition 310 away from the home state 308a may be associated with a depth that is greater than two.

A critical depth 324 for testing the user interface 102 may be determined. In this context, the term "critical depth" refers to a point of differentiation between systematic testing and selective testing. In other words, the states 308 and state transitions 310 of the user interface 102 that are within the critical depth 324 may be tested differently than the states 308 and state transitions 310 of the user interface 102 that are beyond the critical depth 324. In some implementations, the testing program 112 may be configured to explore all of the states 308 and the state transitions 310 that are within the critical depth 324. In contrast, the testing program 112 may be configured to only explore a subset of the states 308 and the state transitions 310 that are beyond the critical depth 324.

In the depicted example, the critical depth 324 is two. Therefore, the home state 308a, the favorites state 308b, the search state 308c, the history state 308d, and the news state 308e, as well as the transitions 310 between these states 308a-e, are within the critical depth 324. Thus, the testing program 112 may be configured to explore all of these states 308a-e and state transitions 310. The other states 308f-k and state transitions 310 are beyond the critical depth 324. Consequently, the testing program 112 may be configured so that it only explores a subset of these states 308f-k and state transitions 310.

Although the critical depth 324 in the depicted example is two, this should not be interpreted as limiting the scope of the present disclosure. The critical depth 324 may be a different value. Also, the critical depth 324 may be configurable. For example, a user of the testing program 112 may adjust the critical depth 324 as desired.

Figure 4:
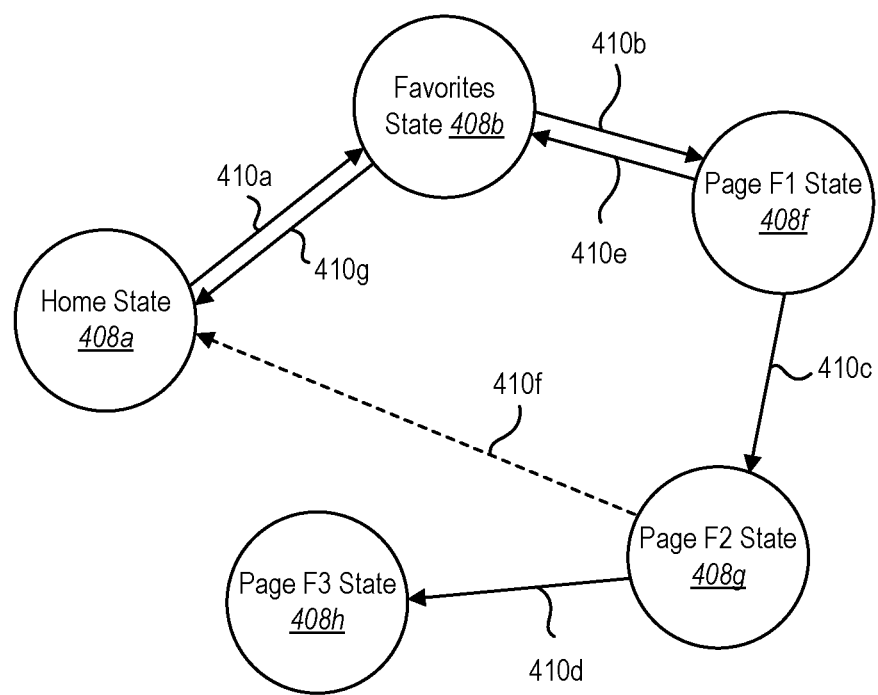
FIG. 4 illustrates an example of certain paths that the testing program may explore in its testing of the user interface.

As indicated above, the testing program 112 may be configured to penalize paths that lead to cycles. FIG. 4 illustrates an example of certain paths that the testing program 112 may explore in its testing of the user interface 102. In this example, starting from the home state 408a (in which the home page 220a is displayed), the testing program 112 may activate the link 222a to the favorites page 220b, thereby causing a transition 410a to the favorites state 408b (in which the favorites page 220b is displayed). Next, on the favorites page 220b, the testing program 112 may activate the link 222e to page F1 220f, thereby causing a transition 410b to the page F1 state 408f (in which page F1 220f is displayed). Next, on page F1 220f, the testing program 112 may activate the link 222g to page F2 220g, thereby causing a transition 410c to the page F2 state 408g (in which page F2 220g is displayed). Next, on page F2 220g, the testing program 112 may activate the link 222h to page F3 220h, thereby causing a transition 410d to the page F3 state 408h (in which page F3 220h is displayed).

It is possible that at some point the testing program 112 may enter a cycle as it tests the user interface 102. In other words, it is possible that the testing program 112 may follow the same path multiple times. A simple example of a cycle involves alternating between two states. For example, when the user interface 102 is in the favorites state 408b, the testing program 112 may activate the link 222e to page F1 220f, thereby causing the user interface 102 to transition 410b to the page F1 state 408f. However, when the user interface 102 is in the page F1 state 408f, the testing program 112 may activate the link 222f to the favorites page 220b, thereby causing the user interface 102 to transition 410e back to the favorites state 408b. Under some circumstances, this simple cycle between the favorites state 408b and the page F1 state 408f may be repeated multiple times.

A more complicated example of a cycle involves repeating a path that includes several states and state transitions. For example, suppose that the testing program 112 explores the following path: home state 408a favorites state 408b page F1 state 408f page F2 state 408g, as discussed above. There may be two possible transitions 410d, 410f out of the page F2 state 408g. One possible transition 410d was discussed previously: the testing program 112 may activate the link 222h to page F3 220h, thereby causing a transition 410d to the page F3 state 408h. Alternatively, however, the testing program 112 may activate the link 222i to the home page 220a, thereby causing a transition 410f to the home state 408a. If this happens, then it is possible that the testing program 112 will repeat the path that it has just explored (i.e., home state 408a favorites state 408b page F1 state 408f page F2 state 408g). It is also possible that this path may be repeated multiple times.

To reduce the likelihood that the testing program 112 will enter a cycle as it tests the user interface 102, the testing program 112 may be configured to penalize paths that are susceptible to cycles. To facilitate this, the testing program 112 may keep track of certain information that may be used to encourage certain paths and discourage others. More specifically, whenever there are multiple states to choose from in the part of the user interface 102 that is beyond the critical depth 324, the testing program 112 may be configured to select one of the possible next states based on probabilities that are associated with transitions to those possible next states. The probability that is associated with the transition to a particular state may be related to the likelihood that the transition could lead to a cycle.

Continuing with the above example, suppose that the testing program 112 is in the page F2 state 408g and is choosing between transitioning 410d from the page F2 state 408g to the page F3 state 408h, or transitioning 410f from the page F2 state 408g to the home state 408a. The testing program 112 may select one of these options based on probabilities associated with these transitions 410d, 410f. The probability associated with a particular transition may be related to the likelihood that the selection of that transition could lead to a cycle. In this example, the transition 410d from the page F2 state 408g to the page F3 state 408h is less likely to lead to a cycle than the transition 410f from the page F2 state 408g to the home state 408a. Therefore, the transition 410d from the page F2 state 408g to the page F3 state 408h may be associated with a higher probability than the transition 410f from the page F2 state 408g to the home state 408a. In other words, the testing program 112 may be configured so that there is a higher probability of selecting the transition 410d from the page F2 state 408g to the page F3 state 408h than of selecting the transition 410f from the page F2 state 408g to the home state 408a.

A specific example illustrating how these probabilities may be assigned will now be discussed. In this example, at least two data structures may be used to keep track of certain information that makes it possible to penalize paths that are susceptible to cycles. A first data structure may define costs associated with transitioning between different states. A second data structure may maintain tallies indicating the total costs that have been incurred during a particular test. In some implementations, these data structures may be implemented as matrices. A matrix that defines the costs associated with transitioning between different states may be referred to herein as an adjacency matrix. A matrix that maintains the tallies indicating total costs of traversal may be referred to herein as a cost matrix. A portion of an adjacency matrix 526 is shown in FIG. 5A. Portions of a cost matrix 528 are shown in FIGS. 5B-5F.

Referring to FIG. 5A, the adjacency matrix 526 may define costs for all of the state transitions that are possible in the user interface 102. These costs may be determined in advance of testing by individuals who are familiar with the user interface 102 and who know which paths are susceptible to cycles.

In the depicted example, the rows of the adjacency matrix 526 indicate the starting point of a state transition, and the columns of the adjacency matrix 526 indicate the ending point of a state transition. Thus, the cell 530a indicates the cost associated with a transition 410b from the favorites state 408b to the page F1 state 408f, whereas the cell 530b indicates the cost associated with a transition 410e from the page F1 state 408f back to the favorites state 408b.

In the depicted example, positive costs are associated with desirable state transitions (e.g., state transitions that are less likely to lead to cycles), whereas negative costs are associated with undesirable state transitions (e.g., state transitions that are more likely to lead to cycles). Thus, the cell 530a corresponding to a transition 410b from the favorites state 408b to the page F1 state 408f is associated with a positive value (e.g., +1), because this transition 410b represents forward progress through the user interface 102 and does not seem likely to lead to a cycle. In contrast, the cell 530b corresponding to a transition 410e from the page F1 state 408f back to the favorites state 408b is associated with a negative value (e.g., −1) because this transition 410e represents a path that the testing program 112 has already explored and could lead to a cycle (e.g., a cycle that involves alternating between the favorites state 408b and the page F1 state 408f). Similarly, the cell 530g corresponding to a transition 410g from the favorites state 408b back to the home state 408a is also associated with a negative value.

As indicated above, the cost matrix 528 may be used to maintain tallies indicating total costs incurred during a particular test. Suppose that a test begins with the path that is shown in FIG. 4 and that was discussed above (i.e., home state 408a→favorites state 408b→page F1 state 408f→page F2 state 408g). FIGS. 5B-5F illustrate portions of the cost matrix 528 at various points in time as this path is explored.

In particular, FIG. 5B illustrates how the cost matrix 528 may be updated after the transition 410a from the home state 408a to the favorites state 408b. When this transition 410a is made, the cell 532a corresponding to this transition 410a may be updated with the value from the corresponding cell 530c in the adjacency matrix 526, namely +1. The sum of all of the cells in the cost matrix 528 at this point is +1.

FIG. 5C illustrates how the cost matrix 528 may be updated after the transition 410b from the favorites state 408b to the page F1 state 408f. When this transition 410b is made, the cell 532b corresponding to this transition 410b may be updated with the value from the corresponding cell 530a in the adjacency matrix 526, namely +1. The sum of all of the cells in the cost matrix 528 at this point is +2.

FIG. 5D illustrates how the cost matrix 528 may be updated after the transition 410c from the page F1 state 408f to the page F2 state 408g. When this transition 410c is made, the cell 532c corresponding to this transition 410c may be updated with the value from the corresponding cell 530d in the adjacency matrix 526, namely +1. The sum of all of the cells in the cost matrix 528 at this point is +3.

In the page F2 state 408g, there are two possible paths that may be selected. The testing program 112 could activate the link 222i to the home page 220a, thereby causing a transition 410f to the home state 408a. Alternatively, the testing program 112 could activate the link 222h to page F3 220h, thereby causing a transition 410d to the page F3 state 408h. To choose between these paths, the testing program 112 may compare what the total value of the cost matrix 528 would be in both scenarios. More specifically, the testing program 112 may determine (i) the total value of the cost matrix 528 that would result from transitioning 410f to the home state 408a, and (ii) the total value of the cost matrix 528 that would result from transitioning 410d to the page F3 state 408h. The testing program 112 may then compare (i) and (ii) to make a decision about which transition to make.

FIG. 5E illustrates the total value of the cost matrix 528 that would result from transitioning 410f from the page F2 state 408g to the home state 408a. If this transition 410f were made, the cell 532d corresponding to this transition 410f may be updated with the value from the corresponding cell 530e in the adjacency matrix 526, namely −1. The sum of all of the cells in the cost matrix 528 at this point would be +2.

FIG. 5F illustrates the total value of the cost matrix 528 that would result from transitioning 410d from the page F2 state 408g to the page F3 state 408h. If this transition 410d were made, the cell 532e corresponding to this transition 410d may be updated with the value from the corresponding cell 530f in the adjacency matrix 526, namely +1. The sum of all of the cells in the cost matrix 528 at this point would be +4.

At any given point in a user interface 102, there are typically multiple paths from which to choose. When the testing program 112 is testing a part of the user interface 102 that is beyond the critical depth 324 and there are multiple paths from which to choose, the testing program 112 may make a probability-based selection of a path based on a relative comparison of the total value of the cost matrix 528. The probability of choosing a particular transition may be expressed as the total value of the cost matrix 528 that would result from that transition divided by the sum of the total value of the cost matrix 528 in all possible scenarios. In the present example, the total value of the cost matrix 528 that would result from transitioning 410f from the page F2 state 408g to the home state 408a is +2 (as shown in FIG. 5E). The total value of the cost matrix 528 that would result from transitioning 410d from the page F2 state 408g to the page F3 state 408h is +4 (as shown in FIG. 5F). The sum of the total value of the cost matrix 528 in all possible scenarios is therefore 2+4=6. Accordingly, in this example the testing program 112 may be configured so that there is a probability of 2/6 that the transition 410f from the page F2 state 408g to the home state 408a will be selected, and a probability of 4/6 that the transition 410d from the page F2 state 408g to the page F3 state 408h will be selected. Thus, in this example, it is more likely that the testing program 112 chooses to transition 410d from the page F2 state 408g to the page F3 state 408h, but it is still possible that the testing program 112 may choose to transition 410f from the page F2 state 408g to the home state 408a.

In the example just described, when the testing program 112 is in the page F2 state 408g, there are two paths from which the testing program 112 can choose: a first path that involves transitioning to the home state 408a, or a second path that involves transitioning to the page F3 state 408h. The testing program 112 may choose between these possible paths by comparing the total cost (e.g., the sum of the total value of the cost matrix 528) associated with both paths. The total cost associated with a redundant path may be less favorable than the total cost associated with a new path. In this context, the term "redundant path" may refer to a path that involves transitioning to a state that has previously been explored. In the example just described, the path that involves transitioning from the page F2 state 408g to the home state 408a may be considered to be a redundant path. The term "new path" may refer to a path that involves transitioning to a state that has not previously been explored. In the example just described, the path that involves transitioning from the page F2 state 408g to the page F3 state 408h may be considered to be a new path. The total cost associated with the redundant path (transitioning from the page F2 state 408g to the home state 408a) is +2 in this example. This value is less favorable than the total cost associated with the new path (transitioning from the page F2 state 408g to the page F3 state 408h), which is +4 in this example.

Stated another way, in the present example the testing program 112 selects a next state based at least in part on which of the plurality of possible next states (i.e., which of the home state 408a or the page F3 state 408h) would provide a most favorable cost metric. In this context, the term "cost metric" refers to an indication (e.g., a numerical indication) of the relative desirability of particular state transitions. In this example, the cost metric is the total value of the cost matrix 528. In alternative implementations, a different cost metric may be utilized.

In some implementations, when selecting a next state in a scenario where there are a plurality of possible next states and a plurality of possible state transitions, the testing program 112 may select the next state based at least in part on one or more cost metrics associated with the plurality of possible next states and the plurality of possible state transitions. The cost metrics may indicate the relative desirability of possible state transitions. In the example just described, the cost metric (e.g., total value of the cost matrix 528) associated with the transition from the page F2 state 408g to the home state 408a and the cost metric associated with the transition from the page F2 state 408g to the page F3 state 408h indicate the relative desirability of these state transitions. The cost metrics associated with untested states and untested state transitions may be more favorable than the cost metrics associated with previously tested states and previously tested state transitions. In the example described previously, the transition 410g from the favorites state 408b back to the home state 408a may be considered to be a previously tested state transition, and the home state 408a may be considered to be a previously tested state. On the other hand, the transition 410d from the page F2 state 408g to the page F3 state 408h may be considered to be a previously untested state transition, and the page F3 state 408h may be considered to be a previously untested state.

Referring again to FIG. 2, another aspect of the present disclosure is related to the application of testing limits to different sections 234a-d of the user interface 102. For example, one or more testing limits may be applied to the section 234a of the user interface 102 that includes the favorites page 220b and other associated pages 220f-h, 220l. Similar limits may be applied to other sections 234b-d. The testing program 112 may be configured to test the links and other elements in the pages within a particular section 234a-d until a relevant testing limit is reached.

In some implementations, a testing limit may be implemented as a limitation on the amount of time that may be spent testing a particular section 234a-d. In other words, the testing program 112 may test the links and other elements in the pages within a particular section 234a-d until a certain amount of time has elapsed. In some implementations, a testing limit may be implemented as a limitation on the number of transitions that may be made while testing a particular section 234a-d. In other words, the testing program 112 may test the links and other elements in the pages within a particular section 234a-d until a certain number of transitions have been made.

More than one testing limit may be applied to a particular section 234a-d. For example, the testing program 112 may be configured to test the links and other elements in the pages within a particular section 234a-d until a time limit or a limit on the number of transitions has been reached, whichever comes first.

Another aspect of the present disclosure is related to the scenario in which the current state is within the critical depth 324 and the testing program 112 is choosing between multiple possibilities that are beyond the critical depth 324 for the next state. An example will be discussed in connection with the pages 220 of the user interface 102 that are shown in FIG. 2 and the corresponding FSM representation that is shown in FIG. 3. Suppose that the testing program 112 has navigated to the news state 308e, which is within the critical depth 324. There are three different possibilities for the next state: the page N1 state 308i, the page N2 state 308j, or the page N3 state 308k. All of these states 308i-k are beyond the critical depth 324.

In this situation, the testing program 112 may be configured to randomly choose one of the possible next states. In other words, in the present example, the testing program 112 may be configured to randomly choose between the page N1 state 308i, the page N2 state 308j, or the page N3 state 308k. From that point forward within that section 234d of the user interface 102, the selection of the next state may be based on probabilities in the manner discussed above.

Figure 6:
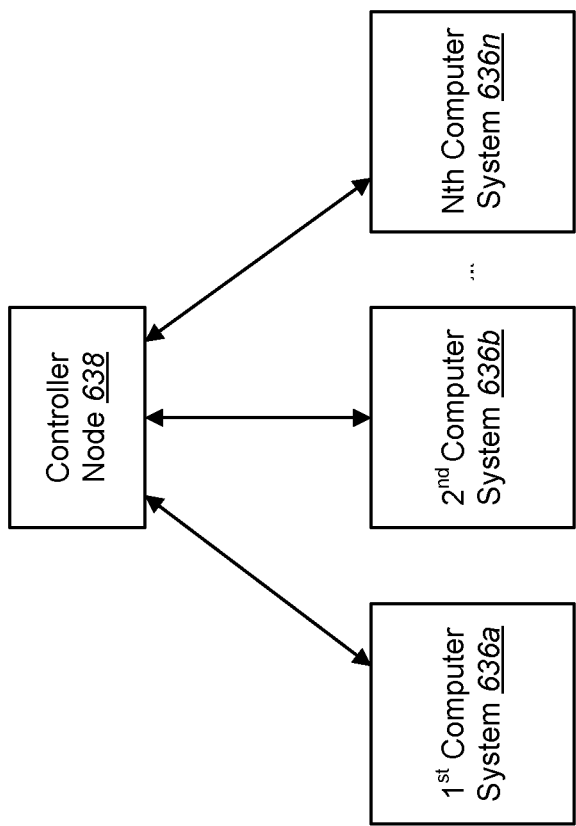
FIG. 6 illustrates a testing environment in which the testing of a user interface is distributed across multiple computer systems.

Reference is now made to FIG. 6. In some implementations, the testing of the user interface 102 may be distributed across multiple computer systems 636a-n. For example, different sections 234a-d of the user interface 102 may be tested by different computer systems 636a-n. A controller node 638n may be responsible for designing the overall testing strategy. The controller node 638n may assign responsibility for testing different sections 234a-d of the user interface 102 to different computer systems 636a-n. These computer systems 636a-n may test their assigned section(s) 234a-d of the user interface 102 and report the results of the testing (e.g., in the form of one or more logs 118) back to the controller node 638.

Figure 7:
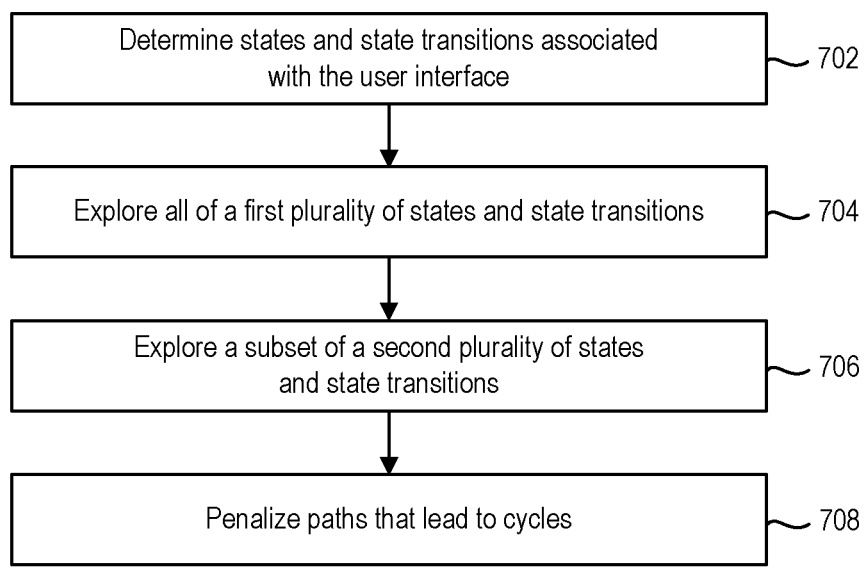
FIG. 7 illustrates an example of a method for testing a user interface of an application in accordance with the present disclosure.

FIG. 7 illustrates an example of a method 700 for testing a user interface 102 of an application 104 in accordance with the present disclosure. The method 700 includes determining 702 states 108 and state transitions 110 associated with the user interface 102. This may involve creating an FSM representation of the user interface 102 (an example of which is shown in FIG. 3).

Some of the states 108 and state transitions 110 may be tested systematically, while other states 108 and state transitions 110 may be selectively tested. In other words, the method 700 may include exploring 704 all of a first plurality of states 108 and state transitions 110 (i.e., those states 108 and state transitions 110 that are of greatest importance and should be tested systematically) and exploring 706 a subset of a second plurality of states 108 and state transitions 110 (i.e., those states 108 and state transitions 110 that are of lesser importance and may therefore be selectively tested). In some implementations, those states 108 and state transitions 110 that are within a critical depth 324 may be tested systematically, while those states 108 and state transitions 110 that are beyond the critical depth 324 may be selectively tested.

As part of exploring 706 the subset of the states 108 and state transitions 110 that can be selectively tested, the method 700 may penalize 708 paths that lead to cycles. This may involve using one or more data structures 114 that define costs associated with particular state transitions 110 and that maintain tallies indicating the total cost that has been incurred during particular tests. State transitions 110 may be selected in a probabilistic manner based on the associated costs.

Figure 8:
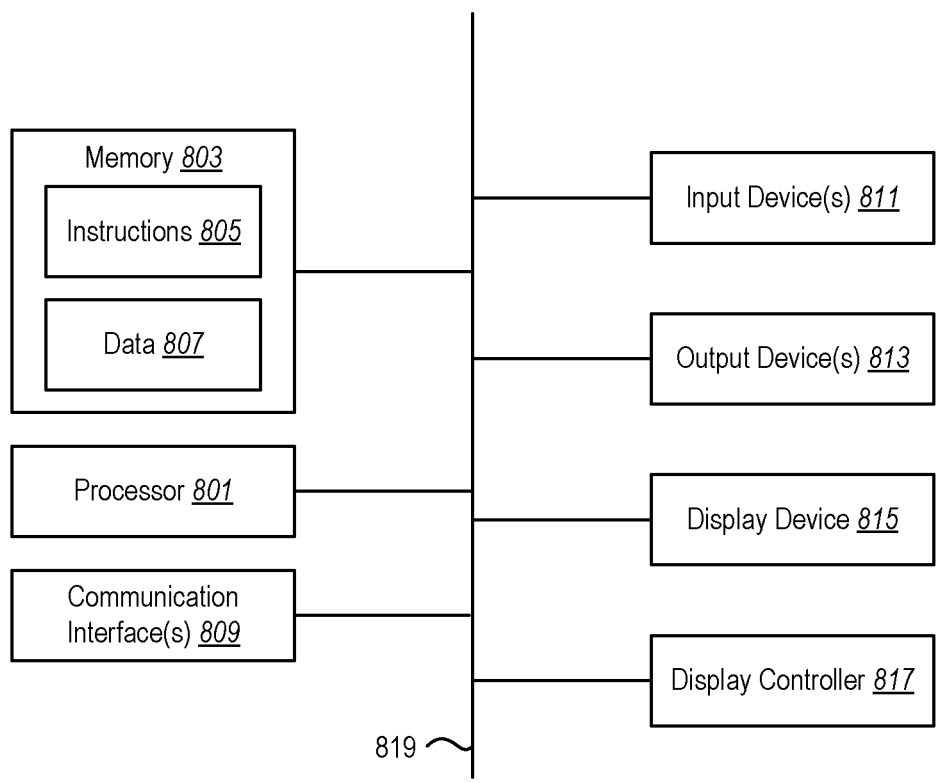
FIG. 8 illustrates certain components that may be included within a computer system.

FIG. 8 illustrates certain components that may be included within a computer system 800. One or more computer systems 800 may be used to implement the various devices, components, and systems described herein.

The computer system 800 includes a processor 801. The processor 801 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 801 may be referred to as a central processing unit (CPU). Although just a single processor 801 is shown in the computer system 800 of FIG. 8, in an alternative configuration, a combination of processors (e.g., an ARM and DSP) could be used.

The computer system 800 also includes memory 803 in electronic communication with the processor 801. The memory 803 may be any electronic component capable of storing electronic information. For example, the memory 803 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 805 and data 807 may be stored in the memory 803. The instructions 805 may be executable by the processor 801 to implement some or all of the functionality disclosed herein, including the method 700 shown in FIG. 7. Executing the instructions 805 may involve the use of the data 807 that is stored in the memory 803. Any of the various examples of modules and components described herein may be implemented, partially or wholly, as instructions 805 stored in memory 803 and executed by the processor 801. Any of the various examples of data described herein may be among the data 807 that is stored in memory 803 and used during execution of the instructions 805 by the processor 801.

A computer system 800 may also include one or more communication interfaces 809 for communicating with other electronic devices. The communication interface(s) 809 may be based on wired communication technology, wireless communication technology, or both. Some examples of communication interfaces 809 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 800 may also include one or more input devices 811 and one or more output devices 813. Some examples of input devices 811 include a keyboard, mouse, microphone, remote control device, button, joystick, trackball, touchpad, and lightpen. Some examples of output devices 813 include a speaker and a printer. One specific type of output device that is typically included in a computer system 800 is a display device 815. Display devices 815 used with embodiments disclosed herein may utilize any suitable image projection technology, such as liquid crystal display (LCD), light-emitting diode (LED), gas plasma, electroluminescence, or the like. A display controller 817 may also be provided, for converting data 807 stored in the memory 803 into text, graphics, and/or moving images (as appropriate) shown on the display device 815.

The various components of the computer system 800 may be coupled together by one or more buses, which may include a power bus, a control signal bus, a status signal bus, a data bus, etc. For the sake of clarity, the various buses are illustrated in FIG. 8 as a bus system 819.

In accordance with an aspect of the present disclosure, a method for testing a user interface is disclosed. The method may include determining states and state transitions associated with the user interface, exploring a first plurality of states and a first plurality of state transitions of the user interface, exploring a subset of a second plurality of states and a second plurality of state transitions of the user interface, and penalizing paths that lead to cycles within the subset of the second plurality of states and the second plurality of state transitions.

The method may further include determining a critical depth for testing the user interface. The first plurality of states and the first plurality of state transitions may be within the critical depth. The second plurality of states and the second plurality of state transitions may be beyond the critical depth.

Penalizing the paths within the subset of the second plurality of states and the second plurality of state transitions that lead to cycles may include navigating to a current state of the user interface that is beyond the critical depth and selecting a next state based at least in part on probabilities associated with transitions from the current state to the plurality of possible next states. The user interface may permit navigation from the current state to a plurality of possible next states. A probability associated with a transition from the current state to a possible next state may be associated with a likelihood that the transition leads to a cycle.

Penalizing the paths within the subset of the second plurality of states and the second plurality of state transitions that lead to cycles may include navigating to a current state of the user interface that is beyond the critical depth and selecting a next state based at least in part on which of the plurality of possible next states would provide a most favorable cost metric. The user interface may permit navigation from the current state to a plurality of possible next states.

Penalizing the paths within the subset of the second plurality of states and the second plurality of state transitions that lead to cycles may include providing a first data structure that defines costs associated with transitioning between different states of the user interface, providing a second data structure that maintains tallies indicating a total cost incurred during a test, and using information from the first data structure to update the second data structure in connection with exploring the subset of the second plurality of states.

The method may further include determining testing limits for different sections of the user interface.

The method may further include navigating to a current state of the user interface that is within a critical depth and randomly selecting one of the plurality of possible next states as a next state. The user interface may permit navigation from the current state to a plurality of possible next states that are beyond the critical depth.

The testing of the user interface may be distributed across multiple computer systems.

In accordance with another aspect of the present disclosure, a system for testing a user interface is disclosed. The system may include one or more processors, memory in electronic communication with the one or more processors, and instructions stored in the memory. The instructions may be executable by the one or more processors to determine states and state transitions associated with the user interface, explore a first plurality of states and a first plurality of state transitions of the user interface, explore a subset of a second plurality of states and a second plurality of state transitions of the user interface, and penalize paths within the subset of the second plurality of states and the second plurality of state transitions that lead to cycles.

The instructions may also be executable by the one or more processors to determine a critical depth for testing the user interface. The first plurality of states and the first plurality of state transitions may be within the critical depth. The second plurality of states and the second plurality of state transitions may be beyond the critical depth.

Penalizing the paths within the subset of the second plurality of states and the second plurality of state transitions that lead to cycles may include navigating to a current state of the user interface that is beyond the critical depth and selecting a next state based at least in part on probabilities associated with transitions from the current state to the plurality of possible next states. The user interface may permit navigation from the current state to a plurality of possible next states. A probability associated with a transition from the current state to a possible next state may be associated with a likelihood that the transition leads to a cycle.

Penalizing the paths within the subset of the second plurality of states and the second plurality of state transitions that lead to cycles may include navigating to a current state of the user interface that is beyond the critical depth and selecting a next state based at least in part on cost metrics associated with the second plurality of states and the second plurality of state transitions. The user interface may permit navigation from the current state to a plurality of possible next states. The cost metrics may indicate relative desirability of possible state transitions. The cost metrics associated with untested states and untested state transitions may be more favorable than the cost metrics associated with previously tested states and previously tested state transitions.

Penalizing the paths within the subset of the second plurality of states and the second plurality of state transitions that lead to cycles may include providing a first data structure that defines costs associated with transitioning between different states of the user interface, providing a second data structure that maintains tallies indicating a total cost incurred during a test, using information from the first data structure to update the second data structure in connection with exploring the subset of the second plurality of states, and choosing between a plurality of possible paths by comparing the total cost associated with each of the plurality of possible paths. The total cost associated with a redundant path may be less favorable than the total cost associated with a new path.

The instructions may also be executable by the one or more processors to determine testing limits for different sections of the user interface.

The instructions may also be executable by the one or more processors to navigate to a current state of the user interface that is within a critical depth and randomly select one of the plurality of possible next states as a next state. The user interface may permit navigation from the current state to a plurality of possible next states that are beyond the critical depth.

In accordance with another aspect of the present disclosure, a method for testing a user interface may include determining a critical depth for testing the user interface, exploring all of a first plurality of states and a first plurality of state transitions that are within the critical depth, exploring a subset of a second plurality of states and a second plurality of state transitions that are beyond the critical depth, and penalizing some of the second plurality of state transitions that lead to redundant paths.

The first plurality of states and the first plurality of state transitions may be within the critical depth. The second plurality of states and the second plurality of state transitions may be beyond the critical depth.

Penalizing some of the second plurality of state transitions that lead to redundant paths may include navigating to a current state of the user interface that is beyond the critical depth and selecting a next state based at least in part on which of the plurality of possible next states would provide a most favorable cost metric. The user interface may permit navigation from the current state to a plurality of possible next states.

Penalizing some of the second plurality of state transitions that lead to redundant paths may include providing a first data structure that defines costs associated with transitioning between different states of the user interface, providing a second data structure that maintains tallies indicating a total cost incurred during a test, and using information from the first data structure to update the second data structure in connection with exploring the subset of the second plurality of states.

The method may further include navigating to a current state of the user interface that is within the critical depth and randomly selecting one of the plurality of possible next states as a next state. The user interface may permit navigation from the current state to a plurality of possible next states that are beyond the critical depth.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for testing a user interface, comprising:
    determining states associated with the user interface, wherein the user interface comprises multiple pages and each state is defined in part based on which of the multiple pages is displayed by the user interface;
    determining state transitions associated with the user interface, each state transition comprising a change with respect to which of the multiple pages is displayed by the user interface, each state transition being initiated by activation of a user interface element;
    associating cost metrics with at least some of the state transitions, wherein the state transitions that lead to cycles are penalized, and wherein a cycle comprises a sequence of a plurality of states and a plurality of state transitions that is repeated a plurality of times;
    determining a critical depth for testing the user interface;
    testing all of a first plurality of states and a first plurality of state transitions that are within the critical depth; and
    selectively testing a second plurality of states and a second plurality of state transitions that are beyond the critical depth based on the cost metrics.

2. The method of claim 1, further comprising:
    navigating to a current state of the user interface that is beyond the critical depth, wherein the user interface permits navigation from the current state to a plurality of possible next states; and
    selecting a next state based at least in part on probabilities associated with transitions from the current state to the plurality of possible next states, wherein a probability associated with a transition from the current state to a possible next state is associated with a likelihood that the transition leads to a redundant path.

3. The method of claim 1, further comprising:
    navigating to a current state of the user interface that is beyond the critical depth, wherein the user interface permits navigation from the current state to a plurality of possible next states; and
    selecting a next state based at least in part on comparing the cost metrics that are associated with the plurality of possible next states.

4. The method of claim 1, further comprising:
    providing a first data structure that defines costs associated with transitioning between different states of the user interface;
    providing a second data structure that maintains tallies indicating a total cost incurred during a test; and
    using information from the first data structure to update the second data structure in connection with exploring the second plurality of states.

5. The method of claim 1, further comprising determining testing limits for different sections of the user interface.

6. The method of claim 1, further comprising:
    navigating to a current state of the user interface that is within the critical depth, wherein the user interface permits navigation from the current state to a plurality of possible next states that are beyond the critical depth; and
    randomly selecting one of the plurality of possible next states as a next state.

7. The method of claim 1, wherein the testing of the user interface is distributed across multiple computer systems.

8. A system for testing a user interface, comprising:
    one or more processors;
    memory in electronic communication with the one or more processors; and
    instructions stored in the memory, the instructions being executable by the one or more processors to:
        determine states associated with the user interface, wherein the user interface comprises multiple pages and each state is defined in part based on which of the multiple pages is displayed in that state;
        determine state transitions associated with the user interface, each state transition comprising a change with respect to which of the multiple pages is displayed by the user interface, each state transition being initiated by activation of a user interface element;
        associate cost metrics with at least some of the state transitions, wherein the state transitions that lead to cycles are penalized, and wherein a cycle comprises a sequence of a plurality of states and a plurality of state transitions that is repeated a plurality of times;
        determine a critical depth for testing the user interface;
        test all of a first plurality of states and a first plurality of state transitions that are within the critical depth; and
        selectively test a second plurality of states and a second plurality of state transitions that are beyond the critical depth based on the cost metrics.

9. The system of claim 8, further comprising additional instructions that are executable by the one or more processors to:
    navigate to a current state of the user interface that is beyond the critical depth, wherein the user interface permits navigation from the current state to a plurality of possible next states; and
    select a next state based at least in part on probabilities associated with transitions from the current state to the plurality of possible next states, wherein a probability associated with a transition from the current state to a possible next state is associated with a likelihood that the transition leads to a redundant path.

10. The system of claim 8, further comprising additional instructions that are executable by the one or more processors to:
    navigate to a current state of the user interface that is beyond the critical depth, wherein the user interface permits navigation from the current state to a plurality of possible next states; and
    select a next state based at least in part on cost metrics associated with the second plurality of states and the second plurality of state transitions, wherein the cost metrics indicate desirability of possible state transitions.

11. The system of claim 8, further comprising additional instructions that are executable by the one or more processors to:
provide a first data structure that defines costs associated with transitioning between different states of the user interface;
provide a second data structure that maintains tallies indicating a total cost incurred during a test;
use information from the first data structure to update the second data structure in connection with exploring the second plurality of states; and
choose between a plurality of possible paths by comparing the total cost associated with each of the plurality of possible paths.

12. The system of claim 8, wherein the instructions are also executable by the one or more processors to determine testing limits for different sections of the user interface.

13. The system of claim 8, wherein the instructions are also executable by the one or more processors to:
navigate to a current state of the user interface that is within the critical depth, wherein the user interface permits navigation from the current state to a plurality of possible next states that are beyond the critical depth; and
randomly select one of the plurality of possible next states as a next state.

14. A method for testing a user interface, comprising:
determining a critical depth for testing the user interface, wherein the user interface has associated states and state transitions, each of the states and each of the state transitions is either within the critical depth or beyond the critical depth, a first testing method is used for the state transitions within the critical depth, and a second testing method is used for the state transitions beyond the critical depth;
exploring all the states and the state transitions that are within the critical depth;
exploring a subset of the states and the state transitions that are beyond the critical depth; and
associating cost metrics with at least some of the state transitions, wherein the state transitions that lead to cycles are penalized, and wherein a cycle comprises a sequence of a plurality of states and a plurality of state transitions that is repeated a plurality of times.

15. The method of claim 14, further comprising:
navigating to a current state of the user interface that is beyond the critical depth, wherein the user interface permits navigation from the current state to a plurality of possible next states; and
selecting a next state based at least in part on comparing the cost metrics that are associated with the plurality of possible next states.

16. The method of claim 14, further comprising:
providing a first data structure that defines costs associated with transitioning between different states of the user interface;
providing a second data structure that maintains tallies indicating a total cost incurred during a test; and
using information from the first data structure to update the second data structure in connection with exploring the subset of the states that are beyond the critical depth.

17. The method of claim 14, further comprising:
navigating to a current state of the user interface that is within the critical depth, wherein the user interface permits navigation from the current state to a plurality of possible next states that are beyond the critical depth; and
randomly selecting one of the plurality of possible next states as a next state.

* * * * *